Patented July 31, 1951

2,562,858

UNITED STATES PATENT OFFICE 2,562,858

SILVER-CALCIUM CATALYST AND ITS PREPARATION

Adrien Cambron and Francis L. W. McKim, Ottawa, Ontario, Canada, assignors to National Research Council, Ottawa, Ontario, Canada, a corporation of Canada No Drawing. Application March 14, 1951, Serial No. 215,659

12 Claims. (Cl. 252—475)

This invention relates to oxidation catalysts, and more particularly to a new silver catalyst and method of preparing the same for use in the oxidation of ethylene and the like.

Many proposals have been made for rendering silver more active as an oxidation catalyst. Various promoters have been added to the silver. Silver in the form of a screen has been amalgamated with mercury. Silver has been alloyed with gold, zinc, copper, iron, manganese, cobalt, nickel, tin, arsenic and antimony. Mechanically prepared silver in finely divided form has been proposed. Silver nitrate solution has been treated with an aqueous suspension of calcium carbonate, the precipitate formed heated to reduce the silver to metal and the oxide impurities removed by solvent.

The object of the present invention is to provide a new, improved and very rugged catalyst, comprising silver, which is highly resistant to inactivation by sintering, which gives high yields in short times of contact, which facilitates high rates of heat transfer and close temperature control in the oxidizing reaction zone and which before being rendered active is readily adapted to conversion to desired physical shapes and ranges of particle size.

A further object of the invention is to provide a convenient, economical and effective method of making such silver containing catalysts.

In accordance with the invention silver is alloyed with calcium, or other alkaline earth metal such as magnesium, barium, and strontium, and substantially all or at least 5% of the alloying calcium or other alkaline earth metal is removed from the alloy to provide the desired catalyst. It is preferred to remove a large proportion of the calcium, since it has been found that such catalysts have longer life. Removal of 5% or less of the calcium gives an activate catalyst but its life is relatively short. Removal of upwards of 80% of the calcium yields catalysts of long life. Alloys from which all but a fraction of 1% of the calcium had been removed have maintained their catalytic activity for more than one year of continuous use.

Active catalysts may be made from alloys containing about one percent of calcium, or other alkaline earth metal. The upper limit of calcium content may vary widely. Alloys containing 75% of calcium have been used. Alloys containing less than about 5% calcium are somewhat malleable and are readily comminuted by turning, while those containing more than about 5% calcium are brittle and may be comminuted by crushing. Alloys containing from about 5 to about 15% of calcium are satisfactory for preparing catalysts in the form of coarse grains. The malleable alloys containing about 2 to 4% of calcium may be drawn into wire and formed into mesh cloth which may then be chemically treated to give the active catalyst. The mesh cloth form catalyst is particularly effective because it permits control of the temperature in the reaction zone by facilitating heat transfer to or from the catalyst.

Alloys having calcium contents of more than 5% may be used in pelleted form after chemical reduction of the alloy. Alloys containing more than 15% of calcium may be reduced chemically to yield fine particles which may be formed into pellets. That is to say the chemical treatment removes a proportion of the calcium from the alloy to render the latter catalytically active. As previously stated at least 5% of the calcium or other alkaline earth metal must be removed to render the alloy catalytically active for oxidation purposes.

In preparing the catalyst silver, preferably oxygen free, and calcium are conveniently melted in a steel crucible under an inert gas such as dry argon or helium. The mixture is heated in the crucible to about 975° C. to form a liquid which is solidified by cooling and the solid alloy is comminuted into turnings or into particles or grains as by crushing. Comminution may be effected in other ways such as disintegration by spraying the molten alloy into an inert gas such as helium or argon.

Turnings of the alloy may be conveniently about ¼ to about ½ mm. thick and grains or particles of crushed alloy may range in size from about ¼ mm. to about 5 mm. in diameter for use in simple metallic tube reactors. Sizes finer than about ½ mm. diameter render the carrying out of the oxidation process in such reactors difficult because of the higher resistance to fluid flow. Gradations of sizes may be used. Thus grains 1.5 to 3 mm., 0.8 to 1.5 mm. and 0.4 to 0.8 mm. diameter have been used. The catalyst may also be formed into pellets.

The sizes of particles may be selected to permit of the use of the so-called "fluidized" method, that is, where the particles are caused to be suspended in a flowing stream of reacting fluid.

The silver alkaline earth metal alloy is made catallytically active by any treatment which removes some or nearly all of the alkaline earth metal with reagents which do not substantially react with the silver. It may be treated in an autoclave with water at a temperature of, say, 250 to 300° C. to convert the alkaline earth metal to its hydroxide or oxide which is removed with the water. This procedure is slow because of the low solubility of the alkaline earth metal hydroxides and oxides in water. It is too slow for practical use when magnesium is the alkaline earth metal employed. When the alloy is very finely divided the solution is more rapid and lower temperatures may be used. The removal may be facilitated by adding to the water an acid which converts the hydroxide or oxide to a more soluble salt. The acid used should not substantially react with the silver. The alloy may be treated with phenol to convert the alkaline earth metal to the phenolate at a temperature of, say, 100 to 200° C. and removing the phenolate with water or dilute acid.

Chemical treatment of the alloy has been conveniently accomplished by passing air, which may be moist, or steam over it at a temperature of about 350° C. for several hours so as to oxidize the calcium of the alloy. Lower temperatures of oxidation by liquids or gases require longer times of treatment to accomplish the desired result. A temperature below about 250° C. is not practical when steam or air is used. The oxidation should not be at a temperature much above 400° C. Alloys containing larger amounts of calcium oxidize more readily.

After the oxidation treatment the alloy is treated with an agent which does not react significantly with silver and which forms water soluble salts of the alkaline earth metal hydroxide or oxide. Acetic acid, formic acid, and citric acid have been found suitable for example in concentrations of from about 5% to about 50%. A solution of four percent hydrochloric acid was satisfactory. Dilute nitric acid in a concentration of about 5%, may be used.

The silver calcium alloy particles may thus be chemically reduced by increasing the proportion of the more electronegative component therein, viz. the silver. At least 5% of the calcium must be removed.

The chemical reducing treatment of the alloy particles may be combined in one operation by treating with an aqueous acid solution containing an oxidizing agent that is non-reactive with the acid. A 20% solution of acetic acid containing 0.2% of hydrogen peroxide has been used successfully to oxidize and remove calcium from particles of silver-calcium alloys to give a residue having high catalytic activity in the oxidation of ethylene to ethylene oxide.

Illustratively, 25.0 grams of silver calcium alloy in particles about 0.8 to 1.7 mm. diameter and containing 6.5% calcium were treated with 1750 cc. of a 20% acetic acid solution containing 8 grams (about 0.5%) of potassium permanganate and heated at 90–95° C. for 1½ hours until the permanganate was all reduced to manganese dioxide. This solution was removed and the grains were treated with a solution of hydrochloric acid to remove manganese dioxide, followed by thorough washing and drying.

The catalytically activated alloy comprising silver may advantageously be placed in metallic tubes through which the oxidizing reaction mixture is passed at controlled temperatures. Suitable known heat exchange media may be flowed around these tubes at controlled temperatures.

The following examples are given to illustrate the effectiveness of the catalyst in the oxidation of ethylene, as well as the effect of removal of the calcium from the alloy.

(1) A silver-calcium alloy containing 5.25% calcium was crushed and 44.1 grams of the alloy ranging in size of grain from about 0.8 mm. to about 1.7 mm. was oxidized in moist air at 400° C. for 48 hours and was treated with 20% acetic acid for 5 minutes, washed and dried. The catalyst contained 3.58% of calcium. It was put into an aluminum tube 12.7 mm. in diameter filling the tube to a depth of about 90 mm. A gas mixture of 2 litres per hour of ethylene and 30 litres per hour of air was passed through the catalyst at a temperature of 268° C. On the twenty fourth day of operation 93.3% of the ethylene reacted and 45.4% of the ethylene reacted was recovered as ethylene oxide.

(2) A silver-calcium alloy containing 6.5% calcium was crushed and 25 grams of the alloy in the size range of about 0.8 mm. to 1.7 mm. was treated with 280 ml. of 20% acetic acid containing 1.8 ml. of 30% hydrogen peroxide; the acetic acid solution thus contained 0.2% $H_2O_2$. The grains of alloy were boiled in this solution for one hour and the solution was removed and the grains were washed in water and then boiled in water 3 minutes twice, followed by a wash in methanol and drying at about 85° C. The catalyst contained 3.9% of calcium after this treatment. The catalyst was placed in a 12.7 mm. diameter aluminum tube which was filled to a depth of about 55 mm. and while heating to 276° C. a mixture of 2 litres per hour of ethylene and 30 litres per hour of air was passed through the catalyst. On the 5th day of operation 75.6 percent of the ethylene reacted and of the reacted ethylene 54.5 percent was recovered as ethylene oxide.

(3) A silver-calcium alloy containing 10.3% calcium was crushed and 25.0 gms. of it ranging in size of grain from about 0.4 mm. to about 0.8 mm. was oxidized in moist air at 400° C. for 21 hours after which it was heated on a steam bath and treated with 100 ml. of 20% acetic acid for 1 hour. It was then decanted and again heated for 1 hour with 100 ml. of 20% acetic acid, washed and dried. Traces of calcium were present in the catalyst. 16 gms. of the catalyst was put into a 12.7 mm. aluminum tube filling it to a depth of about 50 mm. A gas mixture of 2 litres of ethylene per hour and 30 litres of air per hour was passed through the catalyst at a temperature of 264° C. On the seventh day 75.9% of the ethylene reacted and 59.7% of the reacted ethylene was recovered as ethylene oxide.

(4) A silver-calcium alloy containing 9.75% of calcium was crushed and 50 grams of the alloy ranging in size of grain from about 0.4 mm. to 0.8 mm. was treated in a 38.1 mm. electrically heated stainless steel tube with nitrogen at 70 litres per hour containing approximately 10% steam at a temperature of 350° C. for 1 hour when the temperature was increased to 375° C. and approximately 300 grams per hour of steam was passed through the crushed alloy for 4 hours. The oxidized alloy was treated with 20% acetic acid for two hours, washed and dried. The catalyst contained 0.03% calcium. 16 grams of the catalyst was put into a 12.7 mm. aluminum tube filling it to a depth of about 50 mm. A gas mixture of 2 litres of ethylene per hour and 30 litres of air per hour was passed continuously through the catalyst at temperatures between 270° C. and 280° C. On the 29th day of operation 90% of the ethylene reacted and 57% of the reacted ethylene was recovered as ethylene oxide.

(5) A silver-calcium alloy containing 9.25% calcium was crushed and 20 grams of the alloy ranging in size of grain from about 0.4 mm. to 0.8 mm. was treated in a 20 mm. glass U-tube with steam for one hour at a temperature of 350° C. The oxidized alloy was treated with 20% acetic acid for two hours, washed and dried. Traces of calcium were present in the resulting catalyst. 17 grams of the catalyst were put into a 12.7 mm. aluminum tube filling it to a depth of about 50 mm. A gas mixture of 2 litres of ethylene per hour and 30 litres of air per hour was passed continuously through the catalyst at temperatures between 270° and 285° C. On the 24th day of operation 84.2% of the ethylene reacted at a temperature of 285° C. and 54.7% of the reacted ethylene was recovered as ethylene oxide. The activity of the catalyst was undiminished after 224 days of operation.

(6) A silver calcium alloy containing 9.9% calcium was crushed and 25 grams of the alloy ranging in size of grain from about 0.8 mm. to 1.7 mm. was treated with a mixture of 90% nitrogen and 10% steam at a temperature of 350° C. for one-half hour and then with steam only at 350° C. for one hour. The oxidized alloy was treated with 250 cc. of 20% aqueous acetic acid for one hour and the solution decanted. The alloy was then boiled for one-half hour in 250 cc. of aqueous 20% acetic acid, decanted, washed with water, then methanol and dried. The so-treated alloy particles were treated for 20 minutes at room temperature in an aqueous solution containing 0.02 grams chlorplatinic acid ($H_2PtCl_6.6H_2O$) and then washed with water. The catalyst particles resulting contained 1.5% calcium. 16 grams of the catalyst were put into a 12.7 mm. aluminum tube filling it to a depth of about 50 mm. A gas mixture of two litres of ethylene per hour and 30 litres of air per hour was passed continuously through the catalyst at a temperature of 265° C. On the 147th day of operation 84.8% of the ethylene reacted and of the reacted ethylene 56.5% was recovered as ethylene oxide.

(7) A silver calcium alloy containing 50% calcium was ground to pass through a 200 mesh screen. 16 parts by weight of the powdered alloy were placed in 500 parts of distilled water maintained at a temperature of about 25° C. to convert the calcium to the hydroxide. After standing overnight the mixture was filtered and the powder washed with 400 parts of 20% acetic acid solution. The powder was then treated twice with 300 parts of boiling 20% acetic acid for one half hour. The powder was then washed with distilled water and dried. To overcome possible agglomeration of the particles during the acid treatment the powder was reground. Only a trace of calcium remained in the catalytically activated alloy powder. Glycol was added to it to form a paste which was painted on to a metallic, preferably silver, support and dried in an oven. The so mounted catalyst was placed in a reaction vessel and a mixture of 2 litres per hour of ethylene and 30 litres per hour of air was passed continuously through the catalyst at a temperature of 274° C. On the sixth day of operation 40.7% of the ethylene reacted and 63.9% of the ethylene reacted was recovered as ethylene oxide.

(8) A silver calcium alloy containing 75% of calcium was ground to pass through a 10 mesh screen. 19 parts by weight of the powder were placed in 400 parts of distilled water and held overnight in an ice bath. The water was removed and the powder treated with 100 parts of 2% acetic acid and filtered. The powder was then treated with 300 parts of boiling 2% acetic acid for three quarters of an hour. Five treatments with 300 parts of 5% acetic acid for one hour and a further overnight treatment with 300 parts of 20% acetic acid followed by washing with distilled water left only a trace of calcium in the alloy. The activated alloy powder was formed into a paste with glycol and applied to a support as in the previous example. A gas mixture of 2 litres per hour of ethylene and 30 litres per hour of air was passed continuously through the catalyst at a temperature of 266° C. On the tenth day of operation 3.6% of the ethylene reacted and 64% of the ethylene reacted was recovered as ethylene oxide.

It has been found that an alloy containing between 6.5 and 10.3% of calcium is particularly well adapted for compacting on to a metallic carrier, such as silver, prior to treatment which activates the alloy by removing calcium.

As indicated, however, the amount of alkaline earth metal which may be present in the silver alloy, within the bounds of the invention, may vary very widely from about 1% up, provided the alloy is activated by removal of a portion or substantially all of the alkaline earth metal. For commercial use, as now determined, 75% of the alkaline earth metal in the alloy appears to be the upper limit.

This catalyst retains its high activity undiminished over very long periods of time, longer than any hitherto known silver catalysts for the oxidation of ethylene. The production of ethylene oxide by the direct catalytic oxidation of ethylene is a highly exothermic process. The catalyst of this invention facilitates heat transfer in catalyst beds in reactors and permits of accurate uniform temperature control in the reaction zone. Close control of the reaction conditions has been achieved by the catalyst of this invention.

This application is a continuation-in-part of application 14,153, filed March 10, 1948, now abandoned.

We claim:

1. A method of producing an oxidation catalyst which comprises alloying from 1 to 15% of an alkaline earth metal with silver and subjecting the alloy to removal of at least 5% of the alkaline earth content to form an active catalyst without significant removal of silver.

2. A method of producing an oxidation catalyst which comprises alloying from 1 to 15% of calcium with silver and subjecting such alloy to removal of at least 5% of the calcium to form an active catalyst without significant removal of silver.

3. A method of producing a catalyst for the oxidation of ethylene to ethylene oxide which comprises forming an alloy of silver and alkaline earth metal and by dissolution removing at least 5% of the alkaline earth metal from the alloy to render it catalytically active without significant removal of silver.

4. A method of producing a catalyst for the oxidation of ethylene to ethylene oxide which comprises forming an alloy of silver and 1 to 75% of alkaline earth metal and by dissolution removing at least 5% of the alkaline earth metal from the alloy to render it catalytically active without significant removal of silver.

5. A method of producing a catalyst for the oxidation of ethylene to ethylene oxide which comprises alloying silver with an alkaline earth metal and subjecting the alloy in comminuted form to oxidation and treatment with an acid which does not significantly react with the silver to remove substantially all of the alkaline earth metal to render the alloy catalytically active.

6. A method of producing a stable long active oxidation catalyst which comprises alloying silver with an alkline earth metal, heating the alloy in a moist atmosphere at a temperature between 250 and 400° C. and thereafter treating the alloy in comminuted form with an aqueous solution of an acid, which does not react significantly with silver but which forms water soluble salt of the alkaline earth metal to remove from the alloy at least 5% and leave within it at least a trace of the alkaline earth metal to render the alloy catalytically active.

7. A method of producing a stable long active oxidation catalyst which comprises alloying silver with an alkaline earth metal and treating the alloy in comminuted form with an aqueous solution containing an acid which does not significantly react with the silver and an oxidizing agent to remove at least 5% and leave within it at least a trace of the alkaline earth metal from the alloy and render the alloy catalytically active.

8. A method of producing a catalyst for the oxidation of ethylene to ethylene oxide which comprises alloying silver with an alkaline earth metal and subjecting the alloy in comminuted form to treatment with a chemical agent which does not significantly react with the silver to remove substantially all of the alkaline earth metal to render the alloy catalytically active.

9. A method of producing a stable long active oxidation catalyst which comprises alloying silver with an alkaline earth metal, solubilizing the alkaline earth metal in the alloy with a chemical agent at a temperature between 100 and 400° C., which chemical agent does not react significantly with silver but which forms water soluble salt of the alkaline earth metal to remove from the alloy at least 5% and leave within it at least a trace of the alkaline earth metal to render the alloy catalytically active.

10. A catalyst for the oxidation of ethylene consisting of an alloy of silver and from a trace up to 71.25% of alkaline earth metal prepared by treating a silver alloy containing 1 to 75% alkaline earth metal by dissolution to remove from at least 5% to all but a trace of the alkaline earth metal so as to render the alloy catalytically active.

11. A catalyst for the oxidation of ethylene consisting of an alloy of silver and from a trace up to 71.25% of calcium prepared by treating a silver alloy containing 1 to 75% calcium by dissolution to remove from at least 5% to all but a trace of the calcium so as to render the alloy catalytically active.

12. A catalyst for the oxidation of ethylene consisting of an alloy of silver and from a trace up to substantially 9.8% of calcium prepared by treating a silver alloy containing 5.25 to 10.3% of calcium by dissolution to remove from at least 5% to all but a trace of the calcium, without significant removal of silver, to render the alloy catalytically active.

ADRIEN CAMBRON.
FRANCIS L. W. McKIM.

No references cited.